United States Patent Office 3,442,612
Patented May 6, 1969

3,442,612
PROCESS FOR MANUFACTURE OF HYDRAZINE AND ALKYL SUBSTITUTED HYDRAZINES
Ludwig Konrad Huber, King of Prussia, and Luke Ralph Ocone, Wyndmoor, Pa., assignors to Pennsalt Chemicals Corporation, Philadelphia, Pa., a corporation of Pennsylvania
No Drawing. Filed Feb. 9, 1966, Ser. No. 526,042
Int. Cl. C07c 109/02; C01b 21/16
U.S. Cl. 23—190
3 Claims

ABSTRACT OF THE DISCLOSURE

The preparation of hydrazine and lower alkyl substituted hydrazines by reaction of chlorourea and its lower alkyl derivatives with an alkaline metal hydroxide at temperatures between about 0° and 50° C. and in the presence of less than about 50% by weight of the mixture of water, and thereafter isolating the hydrazine product by distillation.

---

The two processes now commercially used for the production of hydrazine are the Raschig process and the urea process. The Raschig process consists of the reaction of a hydochlorite with ammonia. Because the intermediate chloroamine thus formed can react with and destroy hydrazine, such destruction must be minimized in the Raschig process by (1) the use of a large excess of ammonia and (2) reaction at very low concentrations. The large excess of ammonia required necessitates the use of pressure equipment to handle and recycle the ammonia. The low concentrations at which the reaction is carried out require relatively large apparatus to handle the large volumes of dilute solutions which must be processed. In addition, the most practical recovery method for the hydrazine is fractional distillation and this requires the distillation of from 40 to about 110 pounds of water for each pound of hydrazine recovered. Hydrazine distills as an azeotrope in the last fraction and the long distillation times cause decreases in overall yields because of the losses and decomposition of hydrazine during distillation. It is clear then, that the Raschig process leaves much to be desired.

The second process currently used to produce commercial hydrazine is the urea process. This process overcomes the necessity for the use of pressurized equipment by substituting urea for the ammonia used in the Raschig process. However, the urea process also requires that the reaction be carried out in dilute solutions and produces concentrations ranging from about 2.8 to 3.5% by weight hydrazine, requiring extensive concentration by distillation techniques. Since about 20 to 25 pounds of water must be distilled from the output of the urea process to obtain one pound of hydrazine, relatively large equipment, and comparatively low yields are also involved in the urea process. The amount of water needed to be removed by distillation to obtain one pound of hydrazine is referred to as "ballast" and it is obvious that low ballast processes are desirable.

The reaction of chlorourea with sodium hydroxide in dilute aqueous solutions to yield hydrazine has been disclosed by Chalsty and Israelstam (J. South African Chemical Institute, vol. IX, No. 1, pp. 37–38 (1956)). In the process disclosed, however, the hydrazine product is obtained in very dilute aqueous solution (e.g. less than 1%) and the problems of separation to a concentrated hydrazine solution still exist.

The present invention permits the direct preparation of high concentrations of hydrazine and alkyl substituted hydrazines, in simple nonpressurized apparatus, by reacting a heterogeneous mixture of one mole of a chlorourea of structure $R_1NHCONR_2Cl$, where $R_1$ and $R_2$ are selected from the group consisting of hydrogen and lower alkyl, and more than two moles of an alkali metal hydroxide at a temperature between about 0° and 50° C. and in the presence of less than about 50% by weight of the mixture of water, and thereafter isolating the hydrazine product by distillation. In carrying out the process, sufficient liquid is used to provide a workable reaction mixture. The process will be operated under conditions such that the reactants will not be entirely in solution, but will form a workable slurry either in water or in solvents inert to the reaction such as alcohols, preferably lower aliphatic alcohols, amides, e.g., dimethylformamide, dimethylacetamide, etc., aromatic hydrocarbons, e.g. benzene, toluene, etc., ethers and numerous other solvents usually used in organic syntheses.

The present invention permits the preparation of hydrazine in high concentration and the hydrazine product may be separated by distillation of very much lower amounts of water than are required by the Raschig and urea process now commercially used. For example, the prior art processes require that from about 20 pounds (urea process) to 110 pounds of water (Raschig process) be distilled to obtain one pound of hydrazine, whereas the present invention produces hydrazine solutions which require distillation of only from about 3 to 12 pounds of water per pound of hydrazine.

The hydrazines which may be prepared in accord with the invention will be compounds of structure $R_1NHNHR_2$ where $R_1$ and $R_2$ are selected from the group consisting of hydrogen and lower alkyl, as for example methyl, ethyl, n-propyl, isopropyl, isobutyl, t-butyl, and the like. Thus, specific compounds that will be made by this process will include hydrazine, N-methylhydrazine, N,N'-dimethylhydrazine, N-methyl-N'-ethylhydrazine, N-ethylhydrazine, N-propylhydrazine, and the like.

The process details will be discussed below in terms of hydrazine, but it will be understood that these details apply to the above defined hydrazine derivatives as well. Chlorourea and its derivatives may be prepared by conventional methods, e.g., by chlorination of an aqueous solution of urea or N-alkylurea, or by reaction of urea with tertiary butylhypochlorite in an anhydrous system. The chlorourea obtained is stable enough to be handled and stored safely.

The chlorourea, preferably in dry form or as a concentrated aqueous solution is gradually added to a substantial stoichiometric excess of NaOH at from 0 to about 50° C. with agitation. The NaOH may be used in dry form, as an aqueous dispersion or slurry, or as a slurry in inert solvents such as referred to above. The amount of caustic used will be such that the amount of water present is less than about 50% by weight of the total weight of the reactants, and preferably, the amounts of reactants used will be such that the water present is less than about 25% by weight. All that is necessary in operating the process successfully is that enough liquid phase be present (either water or inert solvent) to provide good contact between the reactants while stirring.

In most cases the base will preferably be present in amounts of from 2.5 and most preferably from 3.5 to about 6 moles of base per mole of chlorourea. After the chlorourea has been completely added at temperatures of from about 0° to 50° C., the reaction mixture is heated and the hydrazine recovered by distillation. Distillation is preferably carried out under vacuum, but this is not necessary. It will be understood that hydrazine will be obtained as an aqueous solution of the hydrate if more than one mole of free water is present in the reaction mixture for each mole of hydrazine.

As in most hydrazine-producing reactions, it is desirable, in aqueous systems, to add a small amount of gelatin or animal glue in order to enhance the yields of product obtained. The exact function of this gelatin is not understood, but there appears to be some chelating effect which may serve to remove ions capable of causing decomposition of hydrazine from the reaction mixture.

The following examples will serve to illustrate the invention in more detail.

EXAMPLE 1

Chlorourea (13 g., 0.137 mole) is added in small portions to a stirred mixture of 20 g. sodium hydroxide (0.5 mole), 8 g. water (19% by weight of the reactant mixture) and 1 g. gelatin. The reaction vessel is ice-cooled to maintain an interior temperature of from 2° C. to about 7° C. The reaction mixture does not show any oxidizing properties (fails to colorize potassium iodide-starch paper), indicating complete reaction of chlorourea. About 15 ml. of water is added and the mixture refluxed at 130–140° C. (bath temperature), for one and one-half hours. As the reaction mass distills, 23 g. of distillate is obtained which is shown to contain 11.65% hydrazine corresponding to a 64% yield. The hydrazine solution thus obtained has a water ballast of 7.5 pounds per pound of hydrazine recovered.

EXAMPLE 2

63 g. tertiary butylhypochlorite (equivalent to 0.58 mole) is added dropwise to a solution of 44.4 g. methylurea (0.6 mole) in 180 ml. absolute methanol at about 4–6° C. with agitation. The clear reaction mixture is concentrated to about one-third its original volume by distilling off methanol at about 15 mm. Hg at about 5 to 15° C. The white solid thereby formed is filtered and dried under vacuum, yielding 22 grams of a product which melts at 75–77° C. and consists of crude methylchlorourea:

Calculated (in percent): C, 22.13; H, 4.65; N, 25.82; 65.3 available chlorine. Found: C, 22.68; H, 5.87; N, 26.68; 65.4 available chlorine.

Infrared spectra indicate that the compound is N-methyl-N-chlorourea. Further evaporation produces additional methylchlorourea bringing the overall yield to about 95%.

A mixture of 36 g. sodium hydroxide (0.9 mole), 36 g. water (34.2% by weight of the mixture) and 1 g. gelatin is cooled in an ice bath and 32.4 g. of the above obtained methylchlorourea (0.3 mole) are added in small portions. As methylchlorourea is added, the reaction mixture becomes more fluid and turns reddish while active chlorine disappears. The reaction mixture finally is heated to 100–140° C. for 1 hr., and then the liquids are distilled at about 1 mm. Hg. The distillate contains 8.1% methylhydrazine (about 26% yield), and it is redistilled over a small column to concentrate it for better identification. A 43.5% aqueous solution of methylhydrazine is obtained. The ballast is 11 pounds of water per pound of methylhydrazine.

Calculated for 43.5% aqueous solution (in percent); C, 11.37; N, 26.40. Found: C, 11.50; N, 26.40.

The molar ratio of C:N corresponds exactly to methylhydrazine and the infrared spectrum of the product matches completely with a pure sample of methylhydrazine, proving that no other hydrazines are present.

EXAMPLE 3

When 1 mole of $CH_3NHCONCH_3Cl$ and 6 moles of sodium hydroxide are reacted as in Example 1, distillation of the reaction product yields concentrated aqueous solution of N,N'-dimethylhydrazine.

The advantages of the process of the invention are numerous.

A unique advantage of the process of the invention which is demonstrated in Example 2 above, is that it makes possible direct synthesis of unsymmetrical hydrazines characterized by the structural formulae $$H_2N-NHR_1$$

and $R_1NH-NHR_2$ where $R_1$ and $R_2$ lower alkyl as set forth above. Although this type of hydrazine may be made by the Raschig process by using appropriate mixtures of amines and ammonia, the product of the reaction is a mixture of all of the possible combinations. Thus, in the Raschig process, $CH_3NH_2$ and $NH_3$ yield $H_2N-NH_2$, $H_2N-NHCH_3$, and $CH_3NH-NHCH_3$. In the process of this invention, however, the desired unsymmetrical hydrazine may be made free of these unwanted by-products. In addition, the process of the invention permits low reaction volumes to be used which, in turn, means that smaller, less expensive equipment may be used in the construction of commercial plants. The low volume of liquids to be separated from the reaction product also means a more efficient, more economical process in terms of both equipment, energy requirements, and time. The process contributes further to reduced reaction times by virtue of the relatively high rates of reaction inherent in it. Furthermore, the yields of product produced are high. Thus, it is evident that the process of the invention is one which makes a valuable contribuion to the state of the art.

It will be understood that numerous changes and variations may be made from the above description and examples without departing from the spirit and scope of the invention.

We claim:
1. A process for preparing hydrazine and alkyl substituted hydrazines, which comprises reacting a slurry of one mole of a chlorourea of structure $R_1NHCONR_2Cl$ where $R_1$ and $R_2$ are selected from the group consisting of hydrogen and lower alkyl, with more than two moles of an alkali metal hydroxide at a temperature between about 0° and 50° C., and in the presence of less than about 50% by weight of the mixture of water, and thereafter obtaining the hydrazine product by distillation.

2. A process as in claim 1 where $R_1$ and $R_2$ are hydrogen.

3. A process as in claim 1 where $R_1$ is hydrogen and $R_2$ is methyl.

References Cited

Chalsty et al., Chem. A.B., vol. 51, 1957.

CHARLES B. PARKER, *Primary Examiner.*

PATRICIA C. IVES, *Assistant Examiner.*

U.S. Cl. X.R.

260—583, 553